(12) United States Patent
Provino et al.

(10) Patent No.: US 7,643,436 B2
(45) Date of Patent: Jan. 5, 2010

(54) APPARATUS AND METHOD FOR COMBINING NETWORK CONFERENCES THAT ARE NOT CO-LOCATED

(75) Inventors: Joseph E. Provino, Arlington, MA (US); Jonathan H. Kaplan, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 326 days.

(21) Appl. No.: 11/345,689

(22) Filed: Feb. 1, 2006

(65) Prior Publication Data

US 2007/0177529 A1  Aug. 2, 2007

(51) Int. Cl.
*H04L 12/16* (2006.01)
(52) U.S. Cl. ............... 370/260; 370/285; 370/401; 370/402; 379/202.01
(58) Field of Classification Search ............ 379/201.01, 379/263, 202.01–206.01; 370/260–269, 370/285, 401, 402
See application file for complete search history.

(56) References Cited

U.S. PATENT DOCUMENTS 5,534,914 A * 7/1996 Flohr et al. ............... 348/14.1
6,141,597 A * 10/2000 Botzko et al. ............... 700/94
7,006,616 B1 * 2/2006 Christofferson et al. ............... 379/202.01
7,298,834 B1 * 11/2007 Homeier et al. ......... 379/202.01

* cited by examiner

*Primary Examiner*—Curtis Kuntz
*Assistant Examiner*—Yosef K Laekemariam
(74) *Attorney, Agent, or Firm*—Brooks Kushman P.C.

(57) ABSTRACT

An audio management apparatus manages simultaneous streams of packet-switched audio data for a network conference tool, and allows the combining of conferences that are not co-located. The apparatus uses at least two audio bridges, each of which receives audio inputs from a plurality of local connection points, does mixing of the audio data for each local connection point and provides the audio outputs thereto. Also provided is a communications link between the two audio bridges, and each of the audio bridges creates an audio mix from its local connection points and outputs it over the communications link to the other audio bridge. Each bridge may treat the audio data from the other audio bridge as it does any other call. In this way, the combining of the two conferences is accomplished in a simple and straightforward manner.

19 Claims, 8 Drawing Sheets

APPARATUS AND METHOD FOR COMBINING NETWORK CONFERENCES THAT ARE NOT CO-LOCATED

FIELD OF THE INVENTION

This invention is directed, generally, to the field of network conferencing systems for use on a digital network and, more specifically, to audio communications on such systems.

BACKGROUND OF THE INVENTION

With the rise of networked computing systems, particularly in business settings, new tools have emerged that allow network users, or clients, to interact with one another in various ways. Email, for example is a ubiquitous communication means which allows text messages to be communicated selectively over a network. Similarly, instant messaging and text-based "chats" have proven popular tools for communicating textual information between network clients. More recently, audio communication has been used over digital networks, the best-known format being the "voice-over-internet protocol" (VoIP). Even video conferencing has been used over digital networks, to varying degrees of success.

Collaboration software, sometimes referred to as "groupware" is designed to allow multiple network users to work on a single project together from separate workstations. One version of such software is "NOTES" which is a registered trademark and product of Lotus Development Corporation, Cambridge, Mass. Another is "NETMEETING" which is a registered trademark and product of Microsoft Corporation, Redmond, Wash. The goal of these products is to allow conferencing between multiple network clients, and collaboration among those clients in which they interact to manipulate a target such as a document or "whiteboard." However, while improvements have been made in these products, there are areas in which the ability of users to communicate or collaborate may be improved.

SUMMARY OF THE INVENTION

In accordance with the present invention, an audio management apparatus is provided that manages simultaneous streams of packet-switched audio data for a network conference that provides communication between a plurality of different connection points, with audio data being received from and transmitted to the connection points by the audio management apparatus. The connection points may be audio receiving/transmitting devices used by a participant in a network conference.

The audio management apparatus may be configured so as to allow groups of conference participants in different locations, possibly geographically remote from each other, to connect to each other over a relatively low bandwidth connection. This connection may allow two individual conferences that are not co-located to be joined together. Under this architecture, a first audio bridge is provided that has a conference manager that receives audio data from each of a first group of the connection points. The conference manager of the first audio bridge provides an output mix of audio data to each connection point of the first group according to respective mixing protocols maintained for each connection point of the first group. Similarly, a second audio bridge is provided that has a conference manager that receives audio data from each of a second group of the connection points. The conference manager of the second audio bridge provides an output mix of audio data to each connection point of said second group according to respective mixing protocols maintained for each connection point of the second group.

The first audio bridge and the second audio bridge may be connected by an audio communications link, such as an Ethernet connection or a PSTN telephone connection. Such a link may be established, for PSTN, by a telephony gateway controlled by one of the audio bridges placing a call to a telephony gateway controlled by the other bridge. The communications link between the first audio bridge and the second audio bridge allows the transmission of audio data between the two audio bridges. To facilitate this communication, the conference manager of the first audio bridge provides an output mix of audio data to the link from a plurality of the connection points of the first group. Typically, this may be a mix of the audio data from all of the connection points of the first group, although it may be desirable to omit the inputs from one or more of the connection points of the first group. Likewise, the conference manager of the second audio bridge provides an output mix of audio data to the link from a plurality of the connection points of the second group. Again, this would typically be a mix of the audio data from all of the connection points of the second group, but may also be fewer than all, if so desired.

With conference managers of each of the audio bridges providing a mix of audio data to each other, the audio inputs from the first group of connection points may be distributed to the connection points of the second group, and vice versa. In this way audio communication is enabled between the first group and the second group, and the two conferences are effectively combined. This combination, however, requires only a single audio connection between the two bridges, thereby minimizing the bandwidth used for interconnecting the two audio bridges, and requiring the use of only a single telephone call, if that is the means used to establish the communications link.

Although combining the two conferences provides interconnection between a number of different participants, the implementation of the combination may be relatively simple. The conference manager for each of the audio bridges is configured to process the audio inputs from each of a number of local connection points, and to mix the audio data to be output to each of the connection points. The audio data received from the other audio bridge may be handled in the same way as the audio data received from the local connection points. That is, the mixed audio data stream received from the other audio bridge may be treated as just another "call," and can be mixed with the other audio data streams as appropriate for outputting to the connection points. This makes the combining of multiple conferences relatively easy. The interconnection of audio bridges may also be extended to any number of bridges that may be interconnected with one another in a variety of possible configurations.

BRIEF DESCRIPTION OF THE DRAWINGS

The above and further advantages of the invention may be better understood by referring to the following description in conjunction with the accompanying drawings in which.

DETAILED DESCRIPTION

Figure 1:
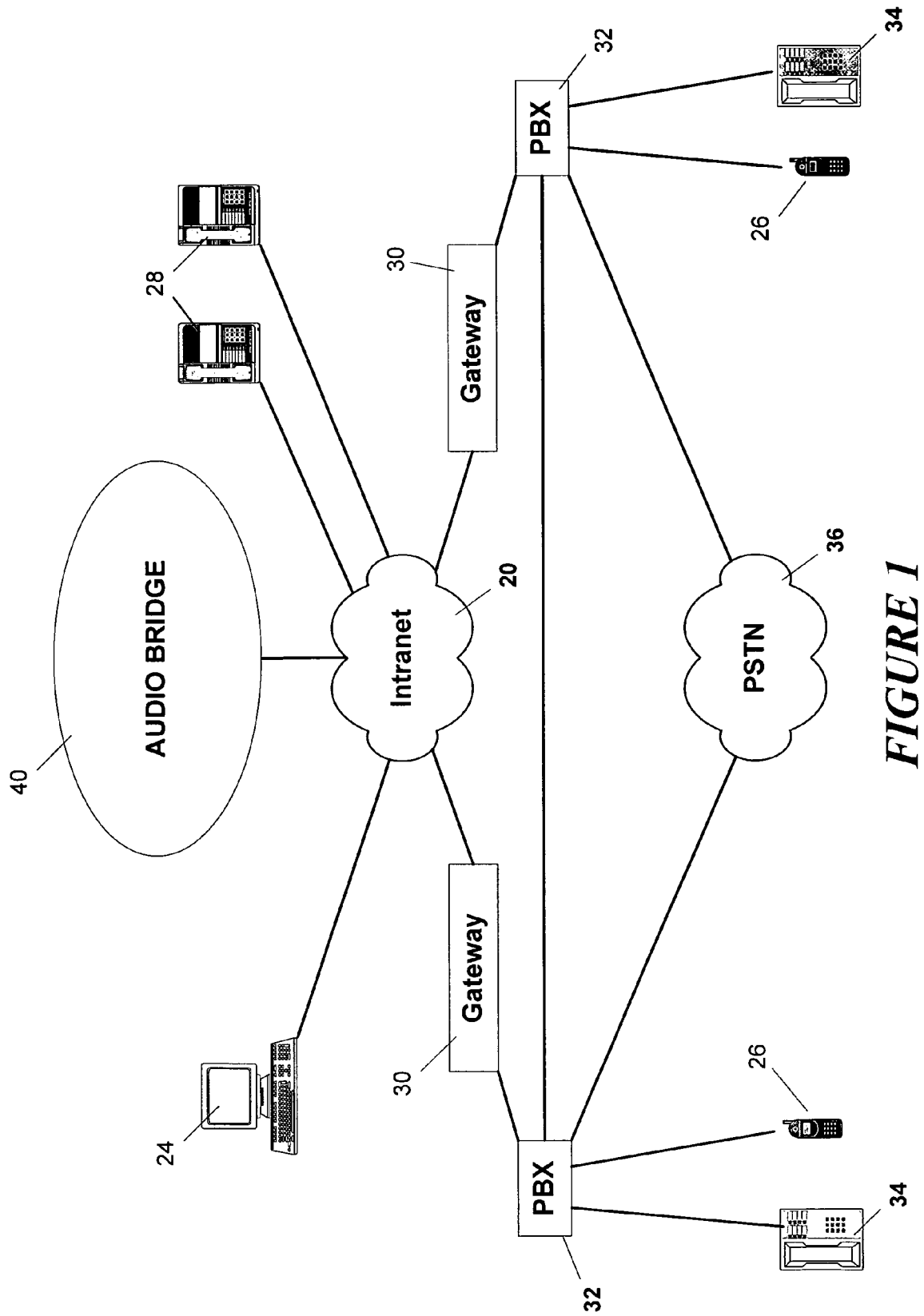
FIG. 1 is a graphical depiction of a network collaboration system environment typical of the present invention.

The present invention may be used with a collaboration tool that operates around a general backbone architecture that allows various access points and functionality. Shown in FIG. 1 is a general overview of some of that accessibility. A digital network, such as intranet 20, can serve as the host for the collaboration tool, and a primary connection medium for the system. Operating with the intranet is audio bridge 40, which provides audio interconnection between a variety of different connection points. Such connection points may include workstation 24, which may host a software phone, and IP phones 28, such as model 7960 produced by Cisco Systems, Inc. These different communications points all transmit and receive data via the intranet 20, and allow a user audio access to the collaboration tool. Also connected to the intranet of FIG. 1 are gateways 30, each of which provide connection to private branch exchange (PBX) switches 32 that each service a number of conventional telephone sets 34 or wireless phones (or other wireless audio devices) 26. The PBX switches 32 may also be connected to a public service telephone network (PSTN) 36, which operates according to conventional telephony principles, as well as to each other, if the two switches are part of a common internal switching network. Those skilled in the art will recognize that the various connection points shown in FIG. 1 are for example only, and that numerous different connectivity arrangements are possible.

Figure 2:
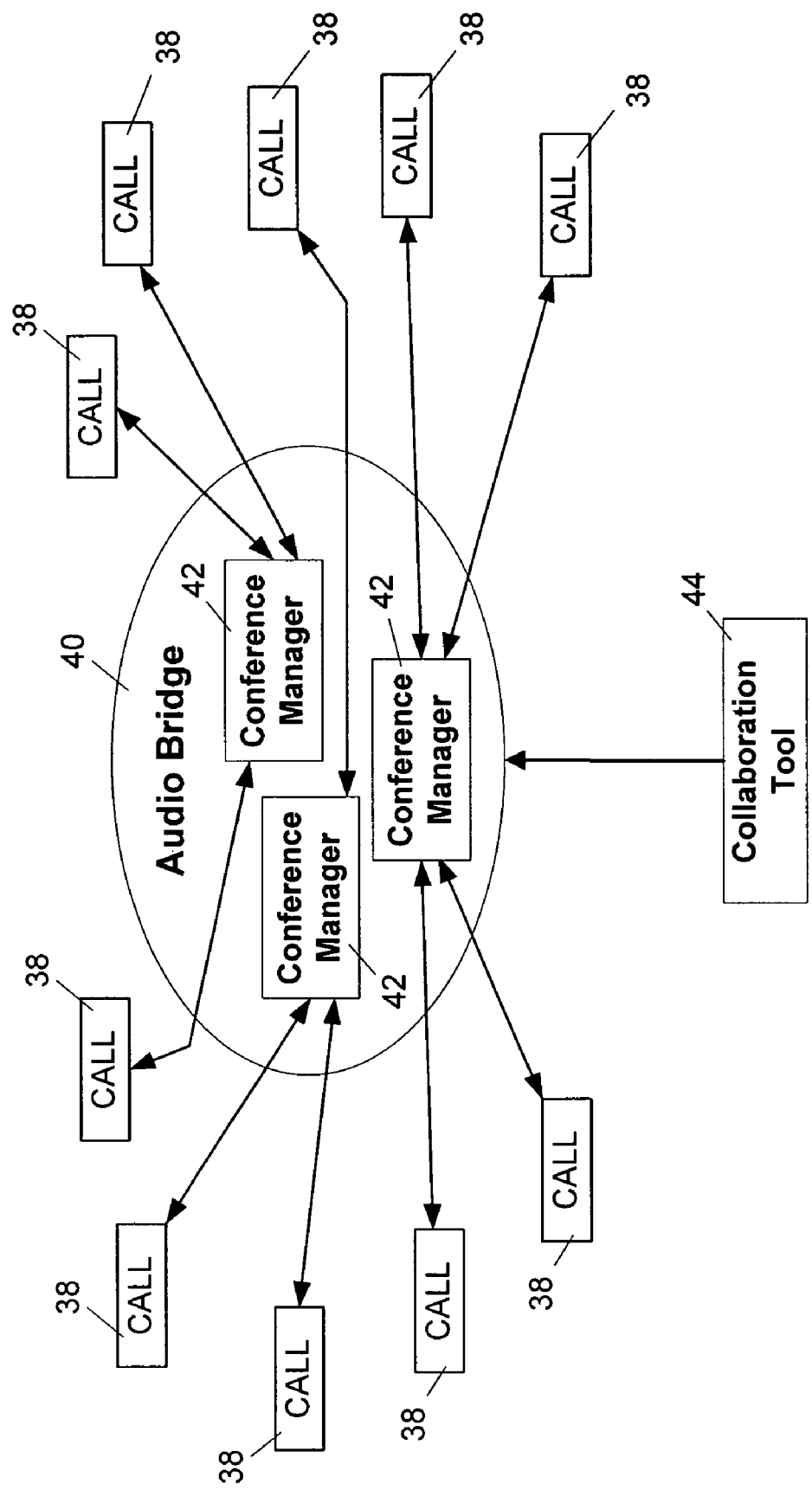
FIG. 2 is a schematic view of an audio bridge of a collaboration tool like that of FIG. 1.

The collaboration tool provides a number of unique functions that simplify and enhance distributed meetings, making them more effective. A critical part of the collaboration tool is the audio interconnection, which allows participants to have a voice conference from different remote locations. The illustration of FIG. 2 shows a graphic depiction of the audio bridge 40, which includes a conference manager 42 for each active conference, each conference manager managing simultaneous streams of packet-switched voice data, and rendering custom mixes of the data streams for each of the users. The manner in which the audio data for each call is mixed is directed by the collaboration tool 44, which provides the necessary instructions to the audio bridge. This custom mixing of the voice data is key to enabling a number of the useful features of the collaboration tool. FIG. 2 demonstrates this capability by the indication of a number of "calls" 38 that are connected to the audio bridge 40. Those skilled in the art will understand that these calls represent streams of audio data that are transmitted over the host network, and that the audio bridge 40 operates in concert with the collaboration tool. The performance of the audio bridge may be controlled via the command protocols of the collaboration tool, which may take a number of different forms. However, the audio bridge 40 itself processes the calls, providing the voice data mixing as appropriate for each.

In the present embodiment, the audio bridge is a java program, and the conference managers 42 are java classes operating with that program (JAVA is a registered trademark of Sun Microsystems, Inc., Santa Clara, Calif.). Shown graphically in FIG. 2 are the conference managers 42, each of which is spawned by the audio bridge as needed. The conference managers govern the processing of all of the calls for a particular conference, as multiple conferences may be managed by the audio bridge simultaneously.

Figure 3:
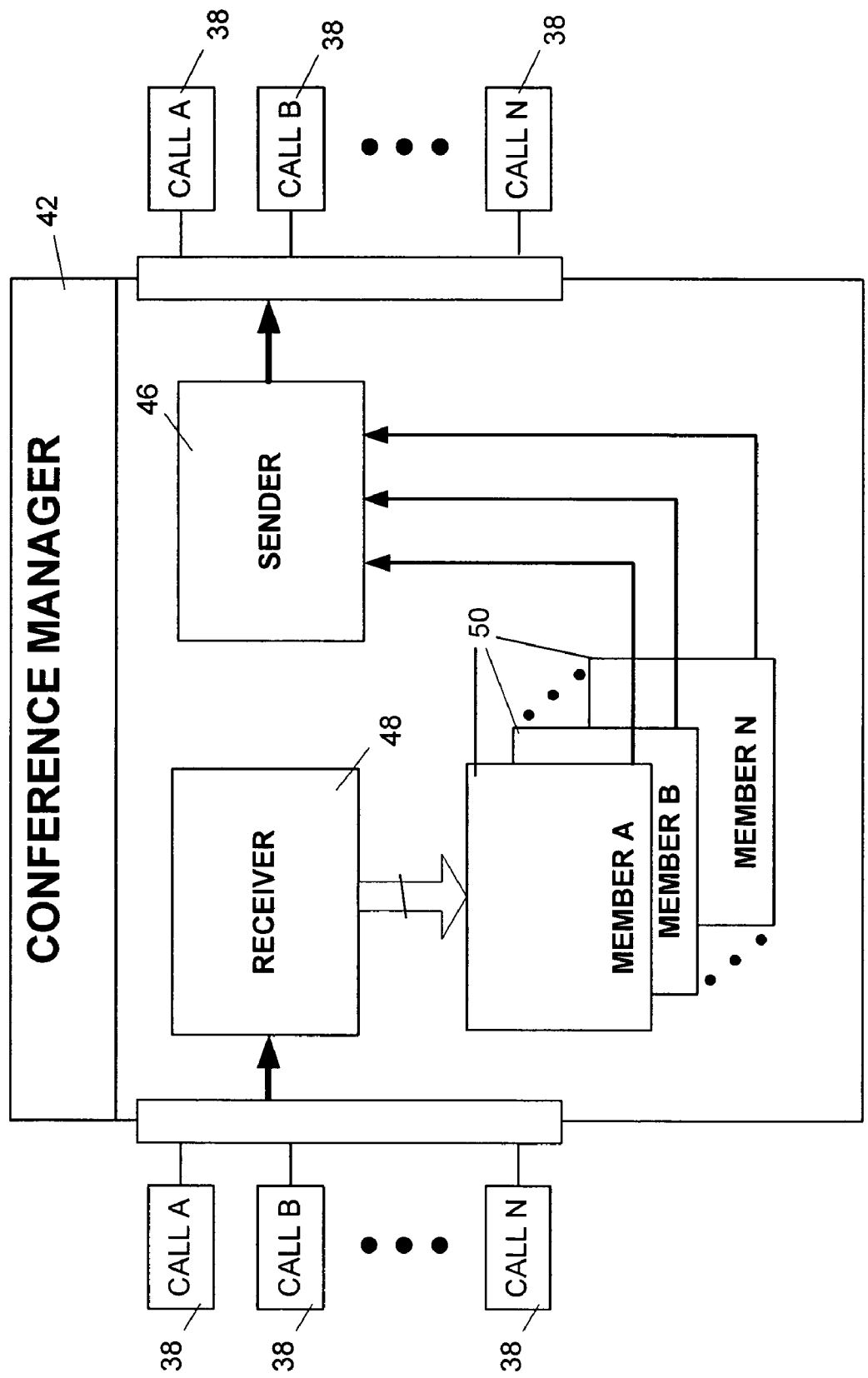
FIG. 3 is a schematic overview of a conference manager that may be used with the audio bridge of FIG. 2.

FIG. 3 is a general overview of a conference manager 42 that may be used with the present invention. The conference manager 42 oversees the processing of the voice data that is communicated between the participants to a given conference. The two-way audio connections of the conference participants, represented by calls 38, originate at different connection points from which the participants may have audio access to the conference over the network. Each of the participants is provided with a customized mix of audio inputs from the other participants, each mix depending on the current rules established in the conference. As shown in the figure, audio data is input and output from the conference manager. Each of the calls is connected via a network socket that is accessed by the conference manager. The input audio data collected from the participants to the conference is received by receiver 48 as it arrives. In this example, the audio data is organized using real-time transport protocol (RTP), in a manner known in the art. Thus, the audio stream is a sequence of data packets that are collected by the receiver 48.

The receiver 48, as well as the sender 46, is an instantiation of a java class. As part of the conference manager, a set of member objects 50 are created, each one representing a different one of the calls 38. Each member object maintains a mixing protocol for its particular call, and ensures that the correct audio mix is provided for that call. The receiver thread, upon receiving data from a particular call, sends a request to the appropriate member object 50 to process the received data. It should be noted that, in this embodiment, all of the input data received by the receiver is handled by a single receiver thread. However, it may be desirable to have multiple receiver threads, so as to split up the packet processing tasks. Nevertheless, the number of receiver threads is independent of the number of member objects. The sender, as discussed below, is also a single thread, or a number of threads otherwise independent of the number of member objects. With the number of input and output threads being independent of the number of member objects, the number of conference participants is flexible, and may be easily increased or decreased as desired for the conference. This provides a simple scalability for an environment in which the number of conference participants is unknown prior to the conference being established, and for which the number of participants may change during the conference.

Each of the member objects maintains a linked list to which packets that it receives are appended as they arrive. The use of linked lists, in general, is well known in the art, and will not be described in any further detail herein. There are also alternatives to linked lists which may be used instead, but the remainder of this description uses linked lists as a representative example. Each member object is responsible for modifying the data that will be output to its call. To do this, the packet data must be modified relative to the data of other packets from the same time interval, and forwarded to the sender 46, which then outputs it to the appropriate call 38. Although the receiver processes all incoming data packets as they arrive, the system maintains a regular time cycle in that the sender processes packets regularly, such as every 20 ms. Thus, for any given member object, data is forwarded by the receiver as it arrives, and each packet is appended to a linked list. Every time cycle, the sender thread processes and removes the first packet in the linked list for each member. This is done by the sender making a request for the member to calculate the packet to be output, processing the mixed packet, and delivering it to the appropriate call via one of the socket associated with that call.

The actual mixing involves the adding and subtracting of audio contributions of the different participants, depending on which contributions each participant is supposed to receive. The mixing may be done in the VoIP domain, so that conventional voice signals are packetized before mixing (after being digitized by the system gateway), while the signals from software phones using the VoIP protocol may be processed directly.

The functionality of the collaboration tool may allow for multiple conversations to take place within the same conference, with some or all of the audio inputs to be excluded from the audio mix of certain participants. Another function is to customize the packets that are distributed to the calls receiving them. One task in this regard is to remove, from the mixed packet sent to a particular call, the contribution of that call. Thus, the audio contribution of a participant is excluded from the audio received by that participant.

Figure 4:
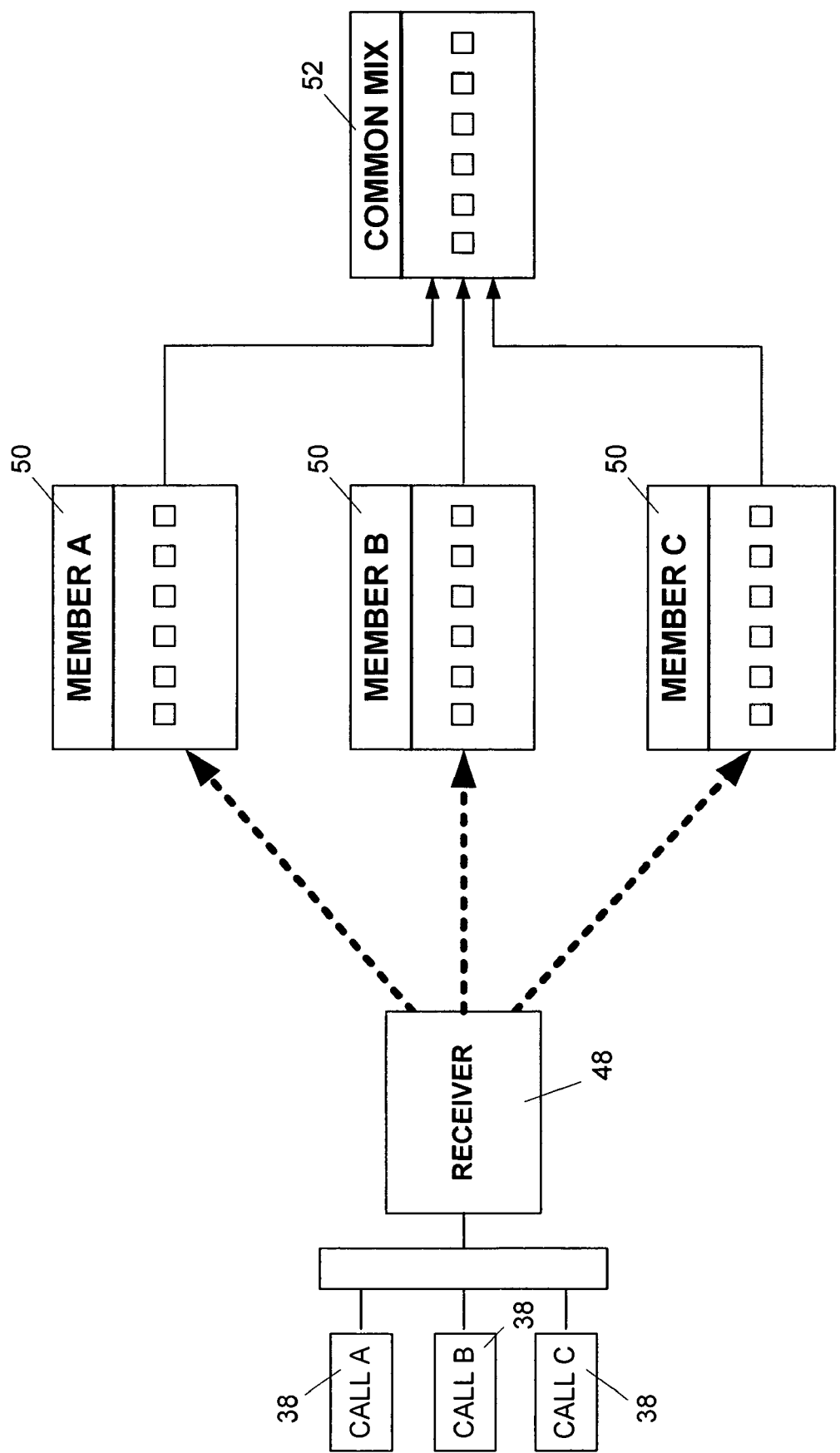
FIG. 4 is a schematic depiction of the audio packet input functionality of a conference manager according to the present invention.

As there are different mixing strategies that may be desired, the conference manager 42 (FIG. 3) must distribute audio data packets appropriately to each of the calls. FIG. 4 shows a graphical depiction of how input packets are processed by the conference manager. Receiver 48 receives incoming packets from the audio inputs present in the conference. The data received by the receiver would typically have a sampling rate and channels that correspond to the incoming calls. This data may be resampled to the preferred sampling rate and channels selected for the conference.

The receiver forwards each packet to the member object that represents the source of the packet. In FIG. 4, there are only three member objects depicted, but those skilled in the art will understand that there may be many more simultaneous active member objects. Each of the member objects 50 maintains the information regarding its particular mix and, upon receiving a packet attributable to its member, it decodes the packet and the decoded packet is appended to a linked list maintained by the member object. The packet data is then added to a common mix object 52 that maintains its own linked list made up of the contributions of all the input calls. The common mix packets are not required to provide the necessary mixing, but serve as a convenient mechanism for creating certain types of mixes, as will be described in more detail hereinafter.

How the data is combined for each outgoing call depends on the mixing arrangement of the conference in question. In a very basic arrangement, where all parties are actively participating in a single discussion, the mix for a user includes all of the input data for the appropriate time segment, but with that user's own contribution subtracted from the mix. Conferences that have more complicated mixes, such as would be required for subgroup conferences, require different combinations of packets from the various members. For example, if there is a subgroup conference between two participants, their audio contributions are withheld from the other conference participants while the subgroup conference is taking place. Thus, for each of the main conference participants that is not participating in the subgroup conference, the data sent to that participant would include the contributions of each of the other participants in the main conference, with the contributions of the participants to the subgroup subtracted (along with the contribution of the participant receiving the mix). Thus, each of the mixing functions requires access to the packets of all the contributors.

Figure 5:
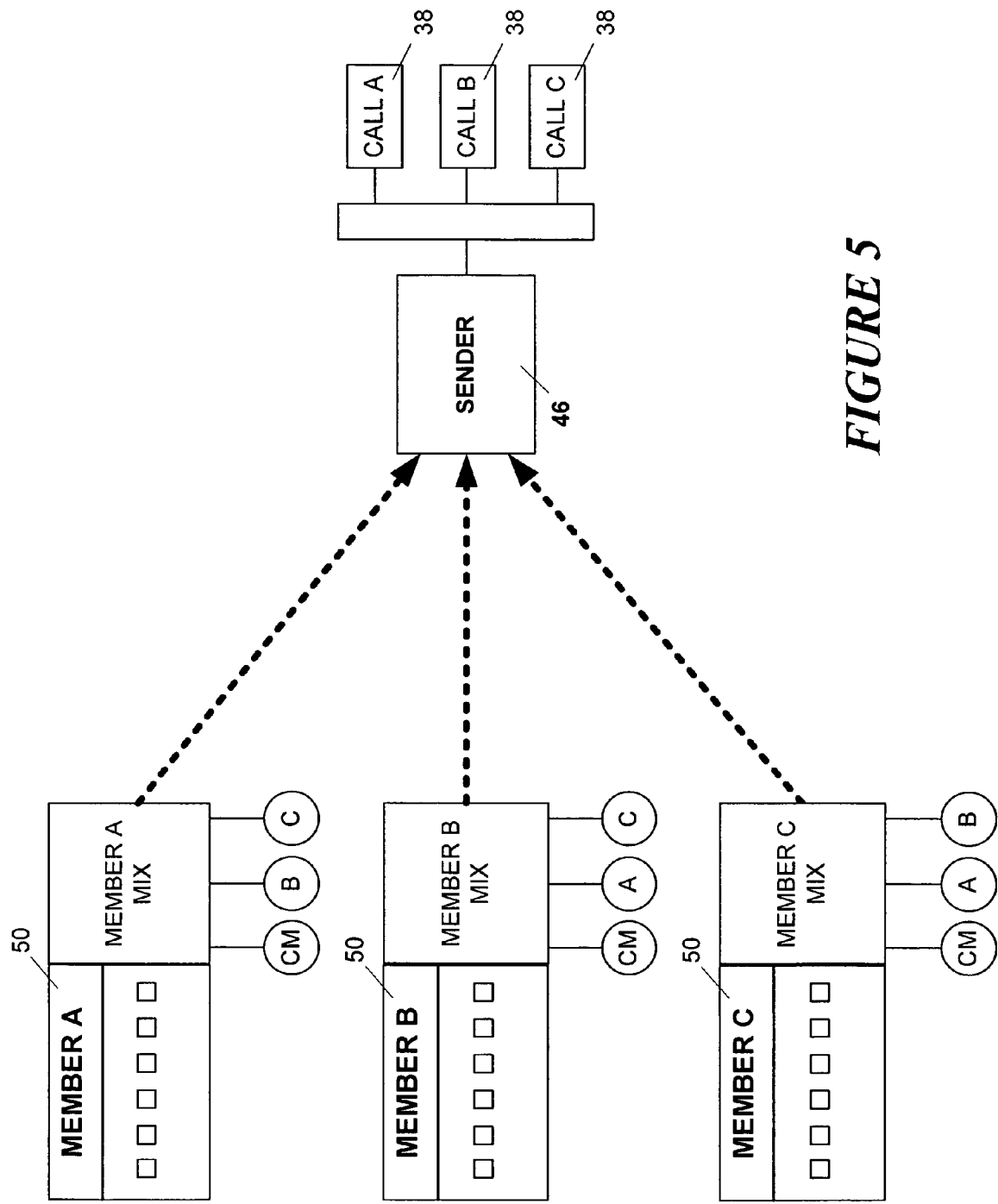
FIG. 5 is a schematic depiction of an audio packet output functionality of a conference manager according to the present invention.

FIG. 5 is a graphical depiction of the output functionality of the conference manager. Three member objects 50 are shown in the figure to demonstrate the mixing process, but those skilled in the art will recognize that there may be many more member objects in actuality, depending on the number of conference participants. The member objects 50 are shown as having a linked list of their own packets (similar to the depiction of FIG. 4), but also as having a mixing functionality that prepares output packets.

Each of the member objects is responsible for preparing the packets to be delivered to the participant represented by that particular object. In order to prepare whichever custom mix is necessary for a given participant, each member object is given access to the packets of the other member objects. This is represented in FIG. 5 by inputs to the mixing functionality of the member objects, each of which is identified by a letter that designates the member object that is the source of the input. Also made available to each of the member objects are the packets of the common mix which, as discussed above, is a sequence of packets each of which is a combination of all the packets received by the member objects during a particular time segment. That is, the common mix is an audio mix of all the audio data input to the conference manager.

The audio outputs from the member objects are assembled by each member object combining the audio packets as appropriate for their respective conference participants. In this example, the incoming packets are decoded by the member objects to put them in a format that allows them to be easily mixed. For example, linear PCM format allows for combinations of different audio packets by simple addition or subtraction, although other formats may be used as well. In a linear PCM format, the audio mixing is performed by each member object performing packet combinations. For example, for a simple conference structure in which all participants can speak and listen in a common forum, each member object would create audio packets that include the contributions of all participants except the participant represented by that object. To assemble such a packet, the member object could combine all of the packets of all of the participants for the time segment in question. Alternatively, and more efficiently, the member object would use the common mix packet for that time segment, and subtract its own packet for that time segment, i.e., the contribution of the participant that it represents.

Those skilled in the art will recognize that the creation of audio output packets to be output from a particular member object is a matter of that member object combining different packets as necessary to create the custom mix that has been designated for the participant represented by that member object. So, if some participants are participating in a subgroup conference, the audio contributions from those participants would be omitted from the output to the other participants. Thus, the member objects for those other participants could create an output mix by adding together packets (other than the common mix packets), while omitting the packets from those participants participating in the subgroup conference. Alternatively, the mix could be created by using the common mix packet and subtracting the packets from those participants in the subgroup conference. It will be recognized that any number of variations in the output mix may be thus created, and each is considered to be within the scope of the invention.

The packets created by the member objects 50 are output via a sender 46. As mentioned above, the sender may be a single thread that sends request to the member objects for audio packets to be output, receives them, and forwards them to the correct calls 38. Because the number of receiver and sender threads are independent of the number of member objects, it allows for the easy scalability of the system to accommodate as many participants as desired. The number of member objects may be expanded and reduced as necessary, without affecting the operation of the audio bridge. This high degree of scalability greatly facilitates the handling of audio data mixing in the collaboration tool, requiring no special modifications for changing the number of calls that are party to a particular conference.

Situations often arise in which it is desirable to include in a conference participants that do not have direct access to the network on which the conference is being hosted. In a conventional system, it would be necessary for many of these participants to connect via a telephone connection over the PSTN, as shown in FIG. 1. However, if a number of participants are at a geographically remote location, and each make an individual telephone connection, it can be costly and inefficient, particularly when some or all of the remote participants have access to a common intranet at the remote location. With the present invention, however, it is possible to combine conferences from locations that are remote relative to each other.

Figure 6:
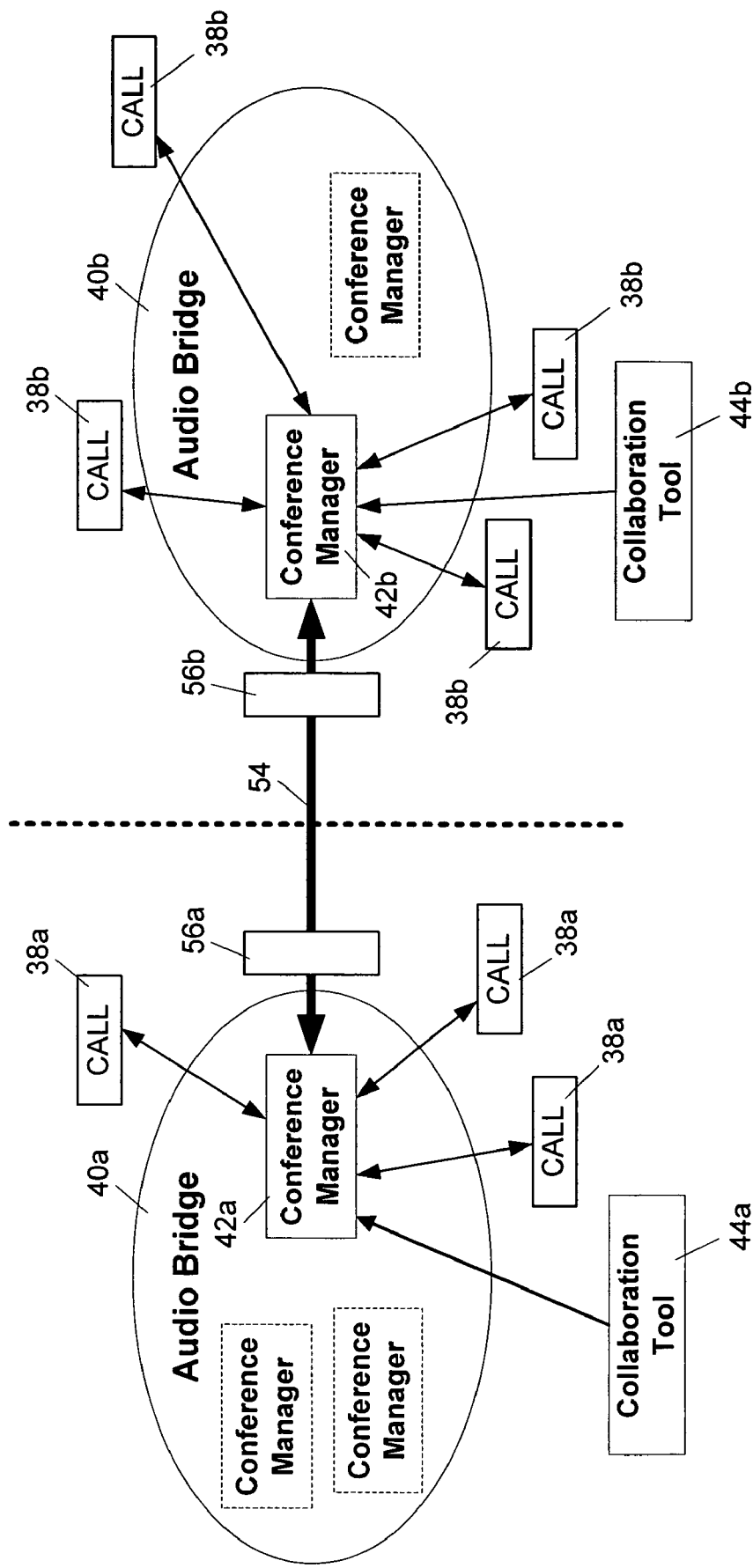
FIG. 6 is a schematic depiction of interconnected audio bridges that combine two conferences not co-located.

Shown in FIG. 6 is a graphical depiction of an arrangement according to the present invention in which two conferences, each controlled by a different audio bridge, are combined. In the figure, the reference numerals associated with the first conference include the suffix "a" and the reference numerals associated with the second conference include the suffix "b." For the first conference, the audio mixing is controlled by audio bridge 40a via a conference manager 42a that is dedicated to that conference. Several calls are shown interconnected via the conference manager 42a. Likewise, audio bridge 40b is hosting a conference at the other location via a conference manager 42b, to which several local calls 38b are connected. Those skilled in the art will recognize that there may be other conference managers running other conferences simultaneously on each audio bridge. However, for the purposes of this description, reference will be made only to the conference managers 42a, 42b shown in the drawings and the calls 38a, 38b shown as associated, respectively, with those conference managers.

As discussed above, any number of the calls directed to one of the conference managers may be connected through a gateway to the PSTN. Thus, the source of the calls may be in any geographic region. Of course, when the source of a call is geographically remote from the location of the gateway, PSTN toll charges are incurred for each of the calls. However, when a number of the calls that are geographically remote from the audio bridge are nonetheless more closely located relative to one another, it is possible to provide a local audio bridge that can receive those calls and mix them together in a local conference. This mixed audio stream may then be treated as a single call for the purposes of contacting the remote audio bridge.

Included in the depiction of FIG. 6 is a link 54 connecting conference manager 42a with conference manager 42b. The link 54 may be, for example, a data connection, such as Ethernet, a telephone link via the PSTN or, alternatively, may be some other type of audio connection. The data input and output via the link 54 is handled by each of the conference bridges 42a, 42b in the same manner as other calls. That is, for the incoming audio data mix from the remote audio bridge, the local conference manager would use a member object to represent that audio mix and to mix the output data to be sent to the conference manager of the remote audio bridge, just as is shown in FIG. 3 for calls of local origin. Likewise, processing with this member object would be in the same manner as for other calls, following the methods depicted in FIGS. 4 and 5. However, for each of the bridges, the output mix for that call is a specialized mix intended for the other conference manager. For example, a common mix for transmission over the link 54 would be a mix of all of the audio inputs from the other calls being managed by the conference manager sending the data. Thus, for the conference manager 42a, the audio inputs of all the local conference participants, represented by the calls 38a, are mixed together and output via the link 54. Similarly, for conference manager 42b, the audio inputs of all the local conference participants, represented by the calls 38b, are mixed together and output via the link 54. Other output mixes, in which audio data from fewer than all the calls handled by a conference manager are output to the other conference manager are output to the other conference manager, are also possible. For incoming data, each of the conference managers 42a, 42b treats the link 54 as the source of another call, and the parameters for mixing that call with others are designated by the respective local collaboration tool 44a, 44b.

If the link 54 makes use of the PSTN, the outputs to the link 54 from the audio bridges will be via telephony gateways 56a, 56b. Thus, it can be seen that only a single connection between the audio bridges is necessary to connect all of the calls of conference manager 42a with all of the calls of conference manager 42b. This prevents the need for multiple calls, and can decrease PSTN toll charges accordingly. However, it may also be desirable to link conferences over another medium. The mixing of the data from multiple calls reduces the bandwidth being used by those calls down to that of a single call. This type of bandwidth reduction may be desirable in other settings as well. Even if there were no toll charges involved in establishing a conference connection between calls 38a and 38b, it might be desirable to mix the calls at each of these locations so as to reduce the traffic over the interconnection between them. In such a case, the link 54 might be any type of data connection. In addition, the mixing together of calls in separate conference bridges provides scalability to a system in that multiple bridges allow the combining together of more calls than a single bridge would provide. Thus, it may be desirable to provide multiple conference bridges, in either the same or different locations, for the sole purpose of increasing call handling capacity.

FIG. 6 shows the coupling together of two audio bridges. However, it is possible to couple together any number of bridges, as desired. A first configuration for coupling a plurality of bridges is shown schematically in FIG. 7. In this "graph" configuration, each bridge is interconnected with each of the other bridges. Thus, the call handling is similar to the two-bridge configuration of FIG. 6, but extended to more bridges. Because of the multiple interconnected bridges, each bridge will generate a mix of its local calls (i.e., those connected directly to that bridge), and will output that to each of the other bridges. In this way, each of the bridges will receive an input from each of the other bridges that consists of a mix of all of the calls local to that bridge, and each of those inputs may be treated as any other call. Those skilled in the art will recognize that this configuration minimizes latency, and may be extended to any number of bridges. Another multiple bridge configuration is shown in FIG. 8. In this "star" arrangement, connection between some of the bridges is indirect, with Bridge 4 functioning as a hub that passes audio mixes between the bridges. As shown, Bridge 4 receives inputs from each of the other bridges, and forwards appropriate mixes to each bridge based on the inputs from the others. This is discussed in more detail below.

In FIG. 8, Bridge 1 is host to Call A and Call B, Bridge 2 is host to Call C and Call D and Bridge 3 is host to Call E and Call F. Each of these bridges provides an output to Bridge 4 that is a mix of its local calls, and these inputs are represented in FIG. 8 by arrows labeled with the letters that identify the calls contributing to each input. Thus, an input from Bridge 1 to Bridge 4 is labeled "A+B", an input from Bridge 2 to Bridge 4 is labeled "C+D" and an input from Bridge 3 to Bridge 4 is labeled "E+F." To ensure that each of the Bridges has the call contributions originating at all of the other bridges, Bridge 4 provides each of Bridges 1, 2 and 3 with the contributions from the other bridges. Thus, the input from Bridge 4 to Bridge 1 is "C+D+E+F", the input from Bridge 4 to Bridge 2 is "A+B+E+F" and the input from Bridge 4 to Bridge 3 is "A+B+C+D." Thus, Bridge 4 operates as if it were simply processing direct calls, by providing to each of the other connected bridges a mix of all of the audio inputs to Bridge 4, minus the input from the bridge to which the output is directed. Although this arrangement may lead to additional issues of latency, it provides a high degree of scalability, as additional bridges may be coupled together without requiring that each bridge is connected with every other bridge.

Figure 7:
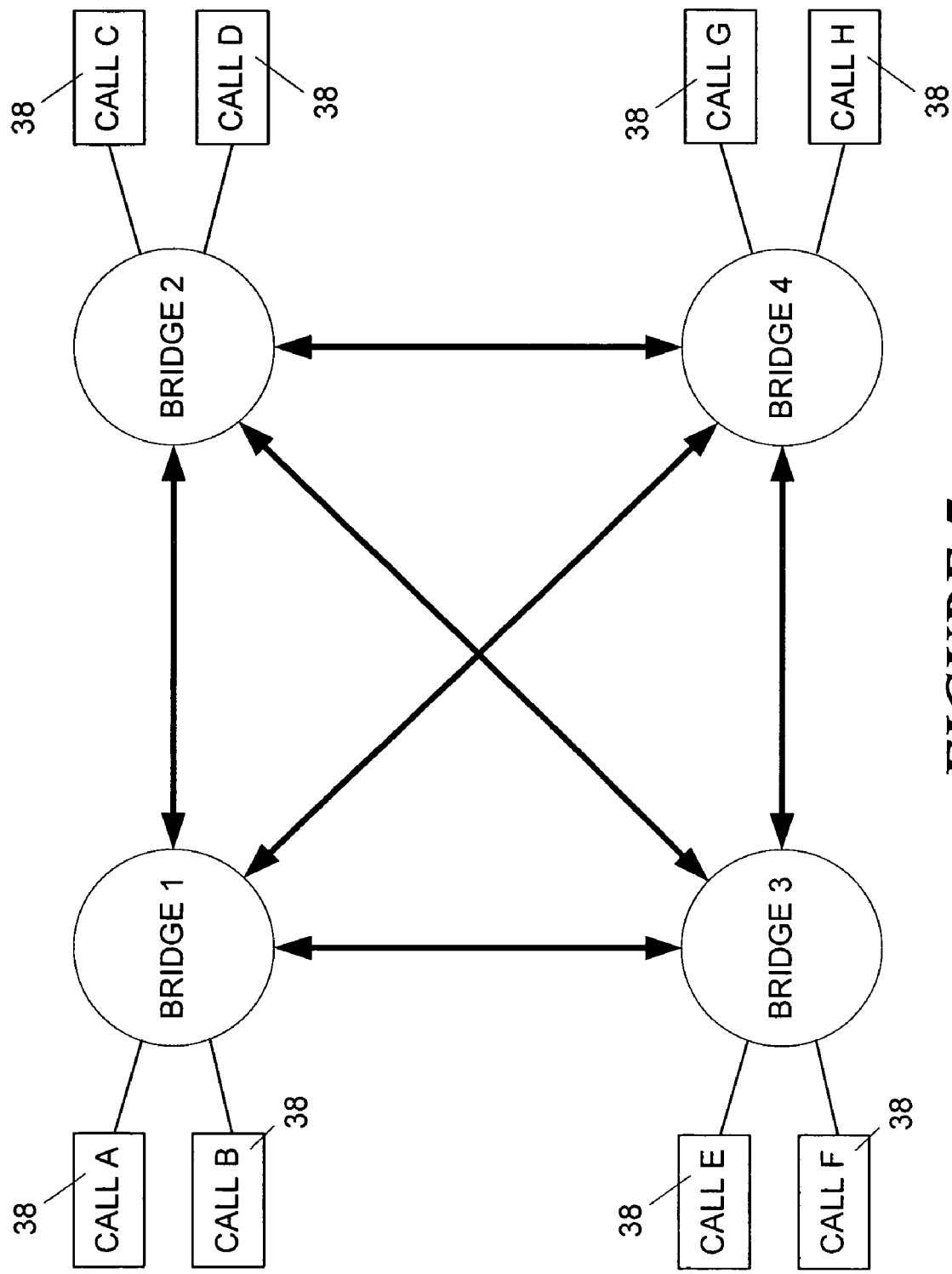
FIG. 7 is a schematic depiction of multiple audio bridges interconnected in a "graph" configuration.
Figure 8:
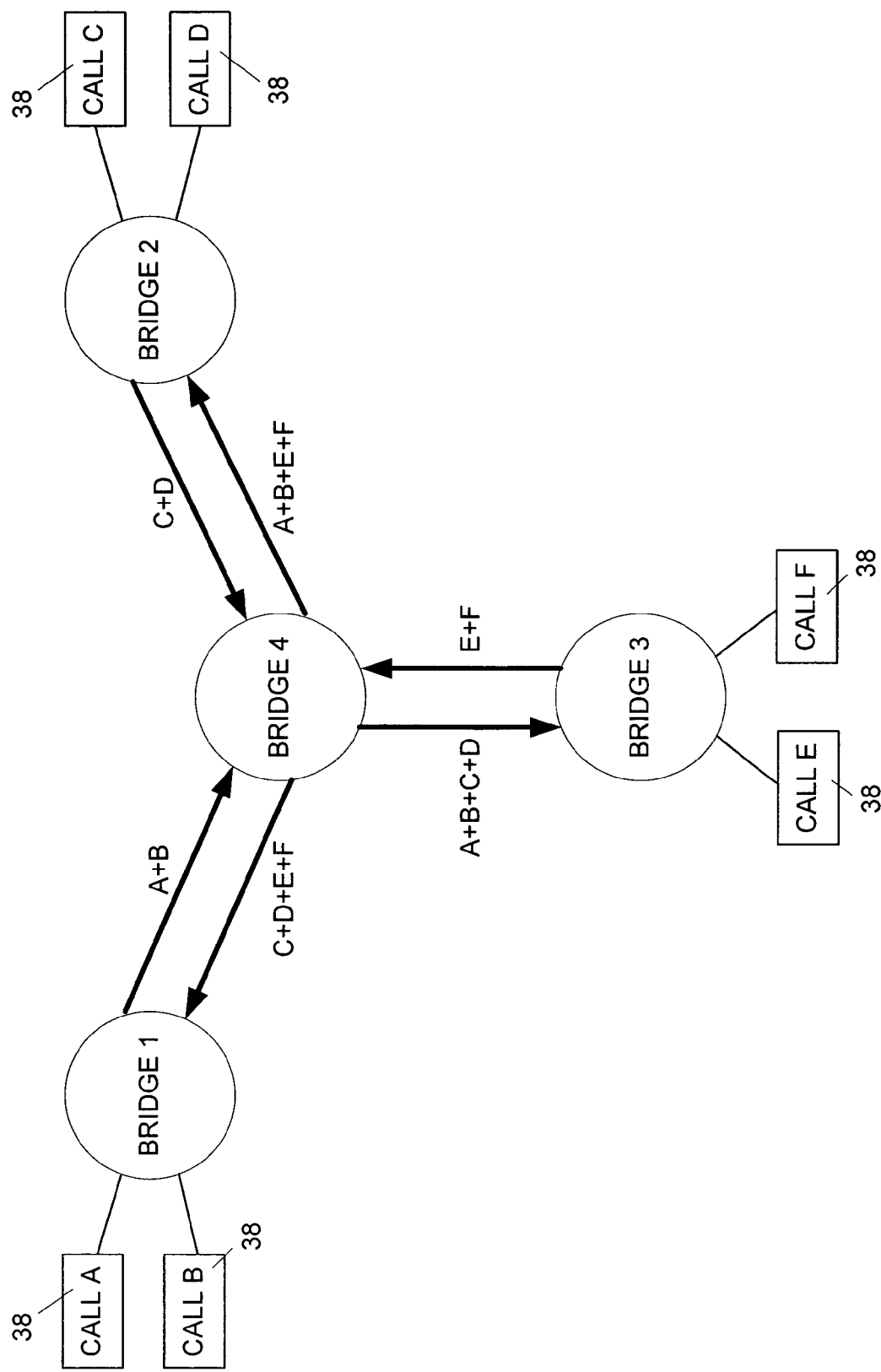
FIG. 8 is a schematic depiction of multiple audio bridges interconnected in a "star" configuration.

The arrangements of FIGS. 7 and 8 for coupling together bridges are only two examples of how such interconnections may be accomplished, and other interconnection configurations are considered to be within the scope of the invention. In addition, the arrangement shown in FIG. 8 does not show Bridge 4 handling any calls directly, but it should be understood that this is also possible. Those skilled in the art will also recognize that the mixing of multiple calls down to a single call prior to connecting it to a conference manager removes the ability of that conference manager to treat separately each of the participants that contributed to the mixed call. Rather, all of the participants mixed together for that call are treated as a combined call, and are added or removed together to the audio data mix received by other participants. Similarly, the participants of the mixed call must be treated as a single party for the purposes of more involved mixing strategies, such as the establishment of conference subgroups. However, the mixing of calls in this manner provides advantages in bandwidth savings and possible reduction of toll costs that would otherwise be incurred.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An audio management apparatus for a network conference that provides communication between a plurality of connection points, the apparatus comprising:

a first audio bridge that receives audio data from one or more connection points of a first group of the connection points, and provides an output mix of audio data to the one or more connection points of the first group according to a first set of mixing protocols maintained for the connection points of the first group;

a first conference manager in the first audio bridge for providing the first set of mixing protocols that selectively adds or removes audio data received at the first audio bridge from the one or more connection points of the first group;

a second audio bridge that receives audio data from one or more connection points of a second group of the connection points, and provides an output mix of audio data to the one or more connection points of the second group according to a second set of mixing protocols maintained for the connection points of the second group;

a second conference manager in the second audio bridge for providing the second set of mixing protocols that selectively adds or removes audio data received at the second audio bridge from the one or more connection points of the second group; and an audio communication link between the first audio bridge and the second audio bridge, wherein the first audio bridge provides a single first output mix of audio data from a plurality of the connection points of the first group to the second audio bridge via the link, wherein the second audio bridge provides a single second output mix of audio data from a plurality of the connection points of the second group to the first audio bridge via the link, and wherein the link enables audio communication between connection points of the first group and connection points of the second group.

2. An apparatus according to claim 1 wherein the first audio bridge and the second audio bridge are geographically remote from each other.

3. An apparatus according to claim 1 wherein the single first output mix of audio data that is received by the second audio bridge from the first audio bridge is processed by the second audio bridge in the same manner as audio inputs from each of the second group of connection points.

4. An apparatus according to claim 1 wherein the single first output mix of audio data provided by the first audio bridge is a mix of the audio data inputs from all of the connection points of the first group.

5. An apparatus according to claim 1 wherein each of the first and second conference managers are operable to receive the audio data and provide the output mix of audio data to its respective group of connection points.

6. An apparatus according to claim 5 wherein each of the first and second conference managers are operable to provide the output mix of audio data from a plurality of the connection points of its group to the conference manager of the other audio bridge via the link.

7. An apparatus according to claim 1 further comprising a third audio bridge that receives audio data from one or more connection points of a third group of the connection points, and provides an output mix of audio data to the one or more connection points of the third group according to a third set of mixing protocols maintained for the connection points of the third group, and a third conference manager in the third audio bridge for providing the third set of mixing protocols that selectively add or remove audio data received at the third audio bridge from one or more connection points of the third group, wherein the third audio bridge provides a single third output mix of the audio data from a plurality of the connection points of the third group to at least one of the first and the second audio bridges via an additional audio communication link.

8. An apparatus according to claim 1 wherein the first conference manager includes a first number of receiver threads and a first number of sender threads and wherein the first number of receiver threads and the first number of sender threads are different than the number of connection points in the first group.

9. An apparatus according to claim 8 wherein the second conference manager includes a second number of receiver threads and a second number of sender threads and wherein the second number of receiver threads and the second number of sender threads are different than the number of connection points in the second group.

10. A method of providing communication between a plurality of different connection points for a network conference, the method comprising:

providing a first audio bridge that receives audio data from a first group of the connection points, and provides an output mix of audio data to one or more connection points of the first group according to a first set of mixing protocols maintained for the connection points of the first group;

providing a first conference manager in the first audio bridge to provide the first set of mixing protocols that selectively adds or removes audio data received at the first audio bridge from the one or more connection points of the first group;

providing a second audio bridge that receives audio data from a second group of the connection points, and provides an output mix of audio data to one or more connection points of the second group according to a second set of mixing protocols maintained for the connection points of the second group;

providing a second conference manager in the second audio bridge to provide the second set of mixing protocols that selectively adds or removes audio data received at the second audio bridge from the one or more connection points of the second group; and connecting the first audio bridge and the second audio bridge with an audio communication link;

generating a single first mix of audio data from a plurality of the connection points of the first group in the first audio bridge and providing the first mix to the second audio bridge via the link; and generating a single second mix of audio data from a plurality of the connection points of the second group in the second audio bridge and providing the second mix to the first audio bridge via the link, wherein the link enables audio communication between connection points of the first group and connection points of the second group.

11. A method according to claim 10 wherein the first audio bridge and the second audio bridge are geographically remote from each other.

12. A method according to claim 10 further comprising processing, in the second audio bridge, the single first output mix of audio data that is received from the first audio bridge in the same manner as audio inputs from each of the second group of connection points.

13. A method according to claim 10 wherein the single first output mix of audio data provided by the first audio bridge is a mix of the audio data inputs from all of the connection points of the first group.

14. An apparatus of according to claim 10 further comprising:

providing a third audio bridge that receives audio data from one or more connection points of a third group of the connection points, and provides an output mix of audio data to one or more connection points of the third group according to a third set of mixing protocols maintained for the connection points of the third group;

providing a third conference manager in the third audio bridge to provide the third set of mixing protocols that selectively add or remove audio data received at the third audio bridge from the one or more connection points of the third group; and providing, from the third audio bridge, a single third output mix of the audio data from a plurality of the connection points of the third group to at least one of the first and the second audio bridges via an additional audio communication link.

15. An audio management apparatus for a network conference that provides communication between a plurality of connection points, the apparatus comprising:

means for receiving audio data from a first group of the connection points associated with a first audio bridge and providing an output mix of audio data to one or more connection points of the first group according to a first set of mixing protocols maintained for the connection points of the first group;

means for providing the first set of mixing protocols that selectively adds or removes audio data received at the first audio bridge from the one or more connection points of the first group;

means for receiving audio data from a second group of the connection points associated with a second audio bridge and providing an output mix of audio data to one or more connection points of the second group according to a second set of mixing protocols maintained for the connection points of the second group;

means for providing the second set of mixing protocols that selectively adds or removes audio data received at the second audio bridge from the one or more connection points of the second group;

means for connecting the first audio bridge and the second audio bridge with an audio communication link;

means for generating a single first mix of audio data from a plurality of the connection points of the first group in the first audio bridge and providing the single first mix to the second audio bridge via the link; and means for generating a single second mix of audio data from a plurality of the connection points of the second group in the second audio bridge and providing the single second mix to the first audio bridge via the link, wherein the link enables audio communication between connection points of the first group and connection points of the second group.

16. An apparatus according to claim 15 wherein the first audio bridge and the second audio bridge are geographically remote from each other.

17. An apparatus according to claim 15 wherein the single first output mix of audio data that is received by the second audio bridge from the first audio bridge is processed in the same manner as audio inputs from each of the second group of connection points.

18. An apparatus according to claim 15 wherein the single first output mix of audio data is a mix of the audio data inputs from the one or more connection points of the first group.

19. An apparatus according to claim 15 further comprising:

means for receiving audio data from one or more connection points of a third group of the connection points associated with a third audio bridge and providing an output mix of audio data to one or more connection points of the third group according to a third set of mixing protocols maintained for the connection points of the third group;

means for providing the third set of mixing protocols that selectively add or remove audio data received at the third audio bridge from the one or more connection points of the third group; and means for generating a single third mix of audio data from a plurality of the connection points of the third group in the third audio bridge and providing the single third mix to at least one of the first and the second audio bridges via an additional audio communication link.

* * * * *

UNITED STATES PATENT AND TRADEMARK OFFICE
CERTIFICATE OF CORRECTION

| | |
|---|---|
| PATENT NO. | : 7,643,436 B2 |
| APPLICATION NO. | : 11/345689 |
| DATED | : January 5, 2010 |
| INVENTOR(S) | : Provino et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twenty-first Day of December, 2010

David J. Kappos
*Director of the United States Patent and Trademark Office*